(12) United States Patent
Papalia et al.

(10) Patent No.: US 6,255,805 B1
(45) Date of Patent: Jul. 3, 2001

(54) DEVICE FOR ELECTRICAL SOURCE SHARING

(75) Inventors: Daniel T. Papalia, Suwanee; Doug Morris, Monroe; Peter G. Hage, Norcross, all of GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/594,111

(22) Filed: Jun. 14, 2000

Related U.S. Application Data

(60) Provisional application No. 60/180,409, filed on Feb. 4, 2000.

(51) Int. Cl.[7] ...................................................... G05F 1/70
(52) U.S. Cl. .............................................................. 323/207
(58) Field of Search .................................... 323/205, 207; 324/426; 363/39, 44

(56) References Cited

U.S. PATENT DOCUMENTS

| | | | |
|---|---|---|---|
| 3,812,377 | * 5/1974 | Malone | 290/4 R |
| 4,234,842 | * 11/1980 | Brennen et al. | 323/210 |
| 4,590,416 | * 5/1986 | Porche et al. | 323/205 |
| 5,198,746 | * 3/1993 | Gyugyi et al. | 323/207 |
| 5,237,507 | * 8/1993 | Chasek | 705/412 |
| 5,416,416 | * 5/1995 | Bisher | 324/426 |

* cited by examiner

Primary Examiner—Adolf Deneke Berhane
(74) Attorney, Agent, or Firm—Philip H. Burrus, IV

(57) ABSTRACT

An apparatus for electrical source sharing between a power grid, at least one local generator and a local load includes a power circuit, a data port and a controller. The power circuit is capable of effecting a plurality of source sharing configurations, including: a fist configuration in which the local load is fully powered by the power grid; a second configuration in which the local load is fully powered by the local generator; and a third configuration in which the local load is partially powered by the power grid and partially powered by the local generator. The data port is capable of receiving data from an external source. The controller is programmed to execute the following operations: receive data from the data port; determine a preferred source sharing configuration from the plurality of source sharing configurations, based on data received from the data port; and instruct the power circuit to effect the preferred source sharing configuration.

19 Claims, 5 Drawing Sheets

DEVICE FOR ELECTRICAL SOURCE SHARING

CROSS REFERENCE TO A PROVISIONAL APPLICATION

This patent application clam priority on Provisional Application Ser. No. 60/180,409, filed on Feb. 4, 2000, the entirety of which is hereby incorporated by reference.

BACKGROUND OF THE INVENTION

1. Field of the Invention

The present invention relates to electrical power distribution systems and, more specifically, to switches used with distributed generation power systems.

2. Description of the Prior Art

Typically, electric power is generated at large scale central generating plants owned by electric utilities and then distributed to local users via a power grid.

Generally, the utilities' long term fixed costs are relatively stable, but short term demand and price fluctuations (for both electricity, and is some instances the fuel used in generation) can be highly unstable. The utility has to provide energy to its customers during all types of demand situations. If a utility designs its fixed assets to meet the highest imaginable demand on the worst day, its assets will be grossly underutilized most of the time. Therefore, the utilities often go to the futures market to secure long term contracts to meet historical demand. However, if certain environmental factors, such as the weather, do not behave as predicted, the utilities can be caught substantially short of supply and have to go to the spot market and pay prices that are significantly higher than what they can charge customers. Consumers under the traditional utility scenario are shielded from these price, supply and demand fluctuations by regulated rates. As a result, the risk and loss is absorbed by the utility and not passed on and the utility really sees the short term instabilities in cost, of which the consumer is unaware. Many of "peaking" plants have been built to take advantage of these instabilities on the wholesale side. Such plants run only when prices get to a certain level.

Local fuel costs may also vary in the shirt term. For example, natural gas prices may be relatively low during the summer months when heating demand is low. They may also vary as a result in short term fluctuations in supply. Therefore, it may be economically feasible to generate electricity locally during periods of low fuel prices and high electricity prices, while it would not be economically feasible to generate locally during periods of high fuel prices and low electricity prices.

Although some homes have local generators, these generators are usually kept on hand for emergency power outages. Configuration of local generators is usually done manually, with local generation being employed during a power outage and the utility power grid being employed once power is restored to the grid. Aside from emergency usage, local generation of electricity using small generators at the consumer's home is not currently widespread because there is no system that efficiently causes power to be supplied by a local generator when local generation is less expensive and supplied by the power grid when local generation is more expensive. For this reason, many homeowners cannot justify the investment in a generator for backup power only.

Therefore, there is a need for a system that allocates power usage between a utility power grid and a local generator based on economic factors such as the relative costs to generate.

DETAILED DESCRIPTION OF THE INVENTION

Figure 1:
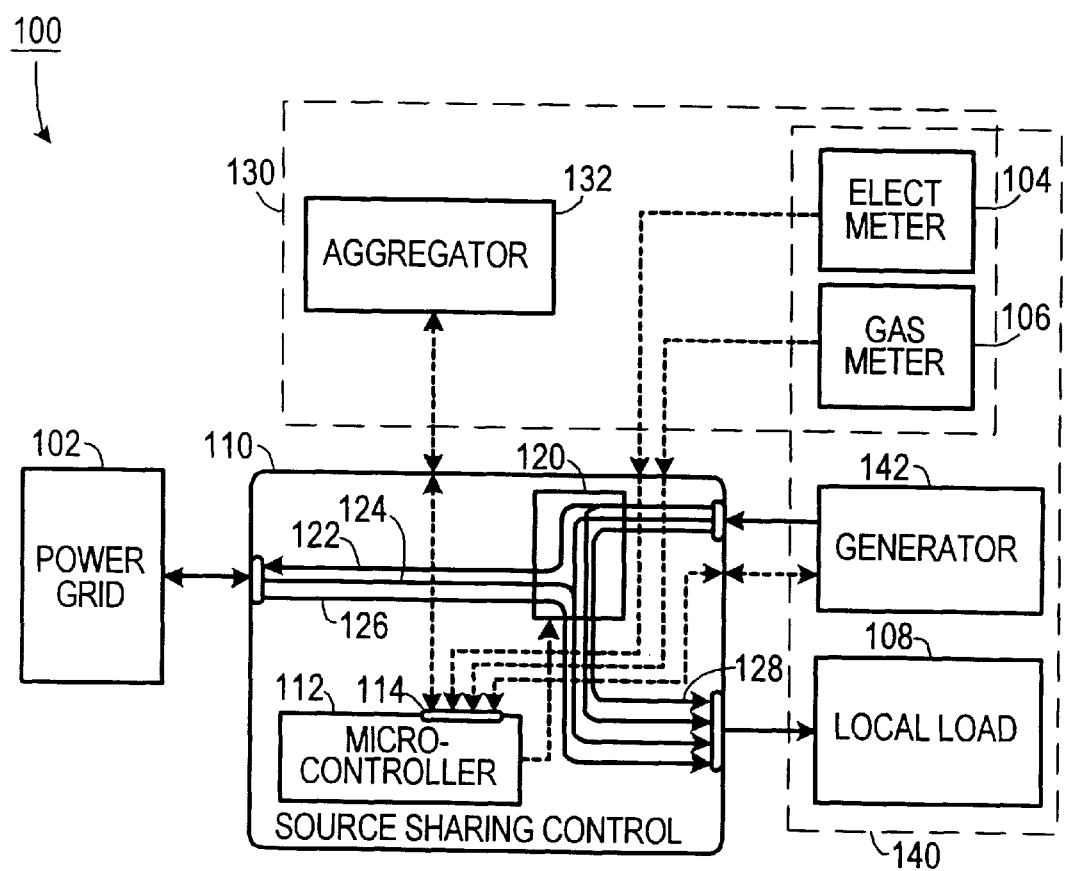
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of"a," "an," and "the" includes plural reference, the meaning of"in" includes "in" and"on." Also, as used herein, "generator" means any device capable of generating electric power.

As shown in FIG. 1, one embodiment 100 of the invention includes a source sharing control circuit 110 that configures power connections between a power grid 102, a local generator 142 and a local load 108. Typically, the local load 108 would include local electrical appliances situated at a local site 140, such as a house or place of business. The local generator 142, an electric meter 104 and a fuel meter 106 (such as a gas meter) would be at the local site 140. Typically, the generator 142 would be a small capacity generator. Examples of such local generators include: microturbine generators, gasoline engine-powered generators, fuel cells, Stirling engines, or any devices that are capable of generating electric power.

The source sharing control circuit 110 receives information from an external data source 130. The data source 130 could include an aggregator 132, a data input from the electric meter 104 and a data input from the gas meter 106. An aggregator 132 is an entity that provides data regarding the economic costs involved in receiving power from the power grid 102 and in generating power from the generator 142. For example, the aggregator 132 could provide the current price of electric power and the current price of fuel (e.g. natural gas) for the generator. The aggregator 132, in one embodiment could simply provide a binary indication of whether current price conditions favor local power generation versus taking power from the grid 102.

The source sharing control circuit 110 includes a micro-controller 112 and a power circuit 120 that is capable of configuring power connections within the source sharing control circuit 110 based on instructions received from the micro-controller 112. The micro-controller 112 receives information from the data source 130 via a data port 114 and determines a preferred source sharing configuration based on data received from the data port 114, and instructs the power circuit 120 to effect the preferred source sharing configuration Such source sharing configurations include: a first configuration 126 in which the local load 108 is filly powered by the power grid 102; a second configuration 128 in which the local load 108 is fully powered by the local generator 142; and a third configuration 124 in which the local load 108 is partially powered by the power grid 102 and partially powered by the local generator 142. The controller 112 may also cause the power circuit 120 to isolate the local generator 142 from the power grid 102 upon sensing a power failure on the power grid 102.

Figure 2:
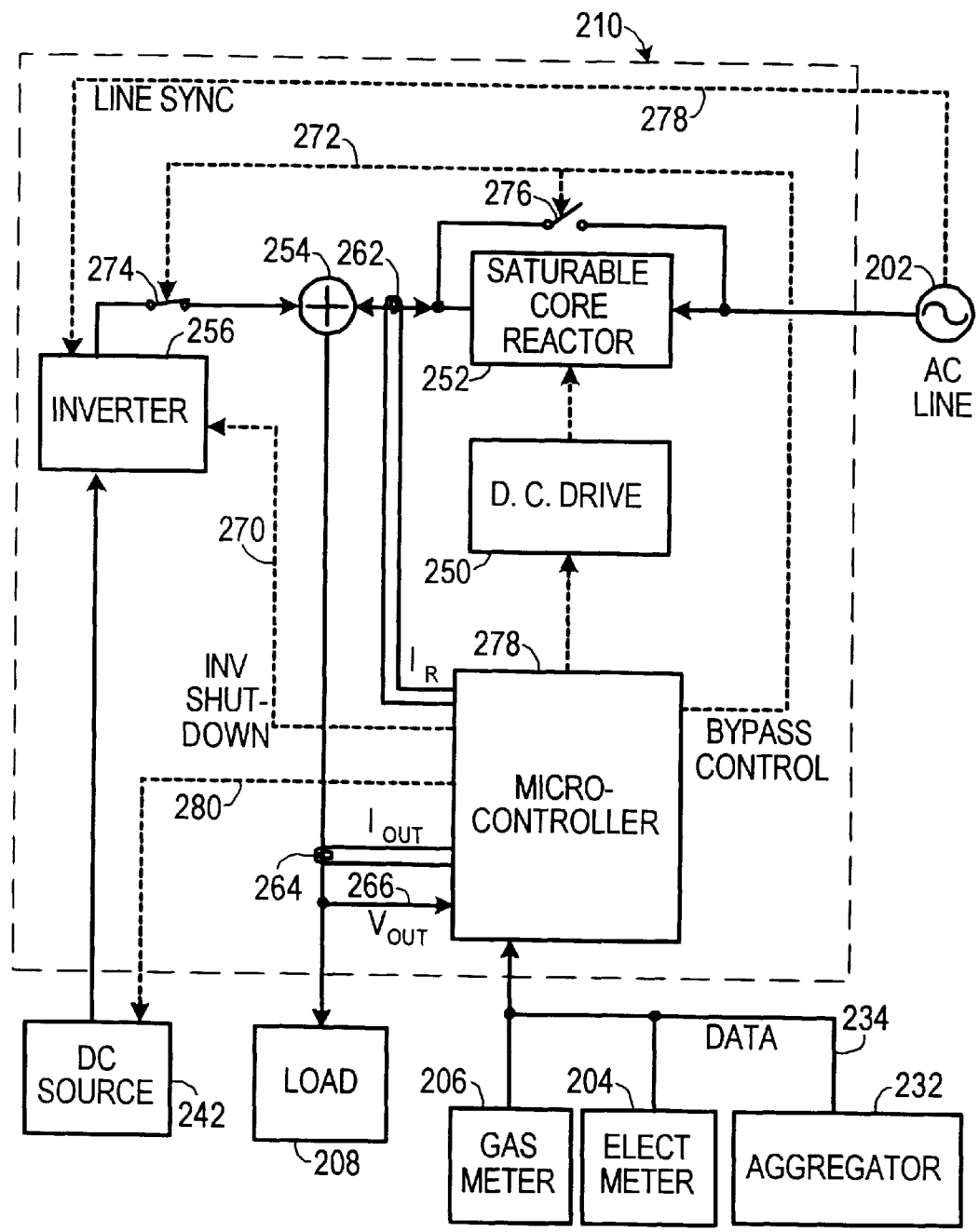
FIG. 2 is a schematic diagram of a source sharing control circuit according to one embodiment of the invention.

Also possible is a fourth configuration 122 in which the local load is fully powered by the local generator 142 and in which the power grid 102 receives power from the local generator 142. The fourth configuration 122 allows the owner of the local generator 142 to sell power back to the utility operating the power grid 102. The controller 112 may be further programmed to execute a net metering mode, wherein the controller 112 monitors the electric meter 104 to determine the current value of the local utility bill and excludes the fourth configuration 122 when the current local utility bill value is not greater than a predetermined threshold value, such as zero. This mode would be used when local law prohibits the utility from having to pay for power received from a local generator in excess of a credit equal an existing balance on a utility account The aggregator 132 may also receive data relative to a current cost of operating the local generator 142, such as information concerning: commodity consumption, the efficiency of the local generator, and the health status of control circuit The aggregator 132 may communicate with the control circuit 110 via the global computer network, via telephone (employing a modem), via satellite communications, via cable, via a local area network, via a paging system, or one of many other types of communication systems. The communications component will also allow a central office, such as one controlling the aggregator 132 to offer future services through existing and future networks such as cable, telephone, and broadband As shown in FIG. 2, one embodiment of the control circuit 210 includes an inverter 256 that receives direct current (C) from the generator 242 and generates an alternating current (AC) therefrom. A saturable core reactor 252 controls the amount of AC that is allowed to flow from the power grid 202. The AC from the inverter 256 is summed with the AC from the saturable core reactor 256 by a summation circuit 254 and then delivered to the load 208. A line sync signal 210 is tapped off of the power grid 202 to provide the inverter 256 with a sync input so that the output of the inverter 256 is synchronized with the output of the saturable core reactor 252.

The microcontroller 278 receives data from the aggregator 232, the gas meter 206 and the electric meter 204 via a data bus 234 (or, depending upon the specific embodiment, several data busses may be used). The micro-controller 278 also senses the load current using a current sensor 264 and senses the load input voltage by tapping off 266 the voltage to the load. The micro-controller 278 further senses the current output by the saturable core reactor 252 using a current sensor 262. Using the data received from the various sources, the micro-controller 278 determines the optimal configuration. Once determined, the micro-controller 278 generates a control signal that controls a DC drive circuit 250, which is essentially an amplifier, that drives the saturable core reactor 252 to control the amount of curt that is allowed to flow from the power grid 202. The micro-controller 278 also generates an inverter shut down signal 270 that controls whether power is allowed to come from the inverter 256. The micro-controller may also generate a generator control signal 280 that turns the generator 242 on and off at the appropriate times.

A bypass circuit 272 allows the generator 242 to be completely isolated from the power grid 202 and all power to be delivered to the load 208 from the power grid 202, with minima loss. In such a case, switch 274 is open and switch 276 is closed, thereby routing power directly from power grid 202 to the summer circuit 254 and the load 208 without going through the saturable core reactor 252. Otherwise, when at least a portion of the power to the load 208 comes from the generator 242, switch 274 is closed and switch 276 is open In one illustrative example of the device shown in FIG. 2, the generator 242 would be rated at roughly 2 KW, or less, and the inverter 256 would be rated at 2 KW. The saturable core reactor 252 would be rated at 30 KVA and would provide bidirectional control with a power control range of 5% to 95%. The load 208 would be the power bus bar to the breaker panel house supply.

Figure 3:
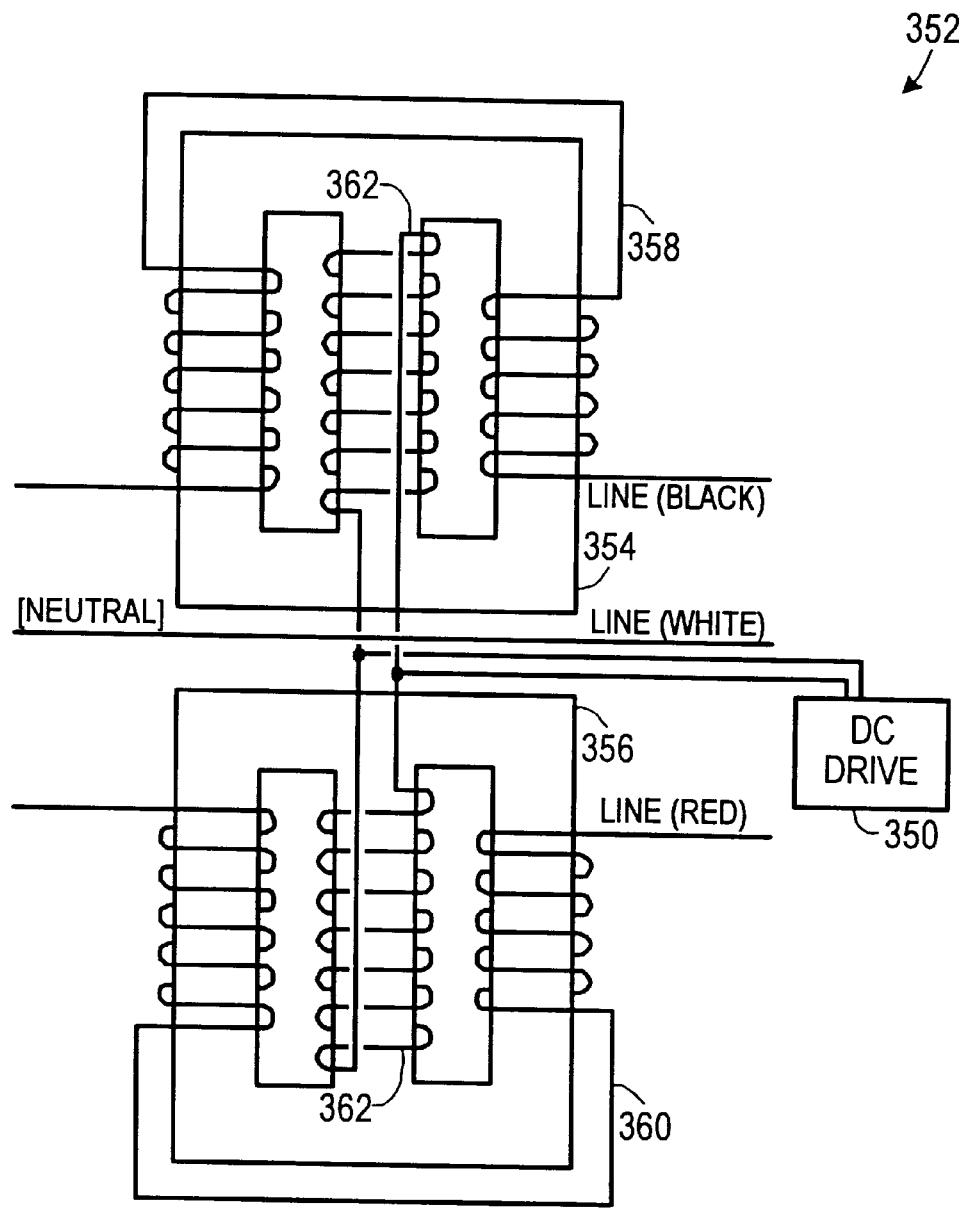
FIG. 3 is a schematic diagram of a core reactor.

One embodiment of a saturable core reactor 352 is shown in FIG. 3. The reactor 352 includes a first silicon steel core 354 and a second silicon steel core 356. The first silicon steel core 354 includes a first outer winding 358 that receives AC power from the black line of a 220 volt power input from the power grid. The second silicon steel core 356 includes a second outer winding 360 that receives AC power from the red line of the 220 volt power input from the power grid. Both cores 354 and 356 have an inner winding 362 that is driven by the a control signal from the DC drive circuit 350. Thus, the amount of current that is allowed to flow through the outer windings 358 and 360, and thus the red and black lines, is a function of the strength of the control signal received from the DC drive circuit 350.

Figure 4:
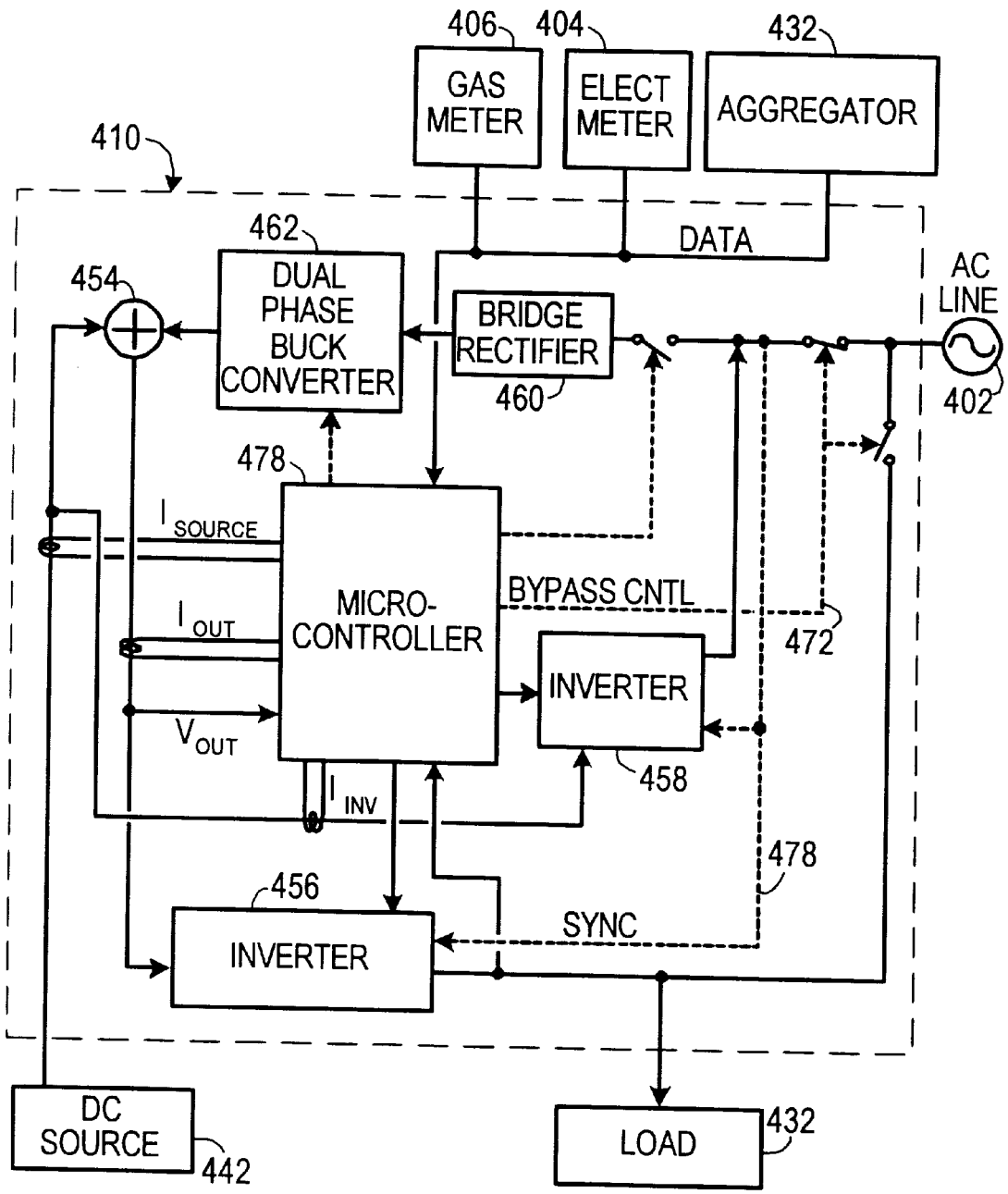
FIG. 4 is a schematic diagram of a second embodiment of a source sharing control circuit.

Another embodiment of the control circuit 410 is shown in FIG. 4. This embodiment uses a rectifier 460 to convert the line AC from the power grid 402 into DC and then controls the amount of power delivered to the summation circuit 454 using a dual phase buck converter 462, employing a pulse width modulation power control scheme driven by the micro-controller 478, which receives input from the electric meter 404, the gas meter 406 and the aggregator 432. This power is summed with the DC power from the generator 442 and delivered to a first inverter 456, which converts the DC power to AC and then delivers the AC power to the load 432. The first inverter 456 is synchronized with the AC line current by a sync signal 478 tapped off of the AC line current To enable the transfer of power from the generator 442 to the power grid 402, a second inverter 458 converts DC power from the generator 442 to AC power, which is then transferred to the power grid 402. A bypass control circuit 472 allows the micro-controller 478 to configure control circuit 410 either for receiving power from the power grid 402 or transferring power to the power grid 402.

Figure 5:
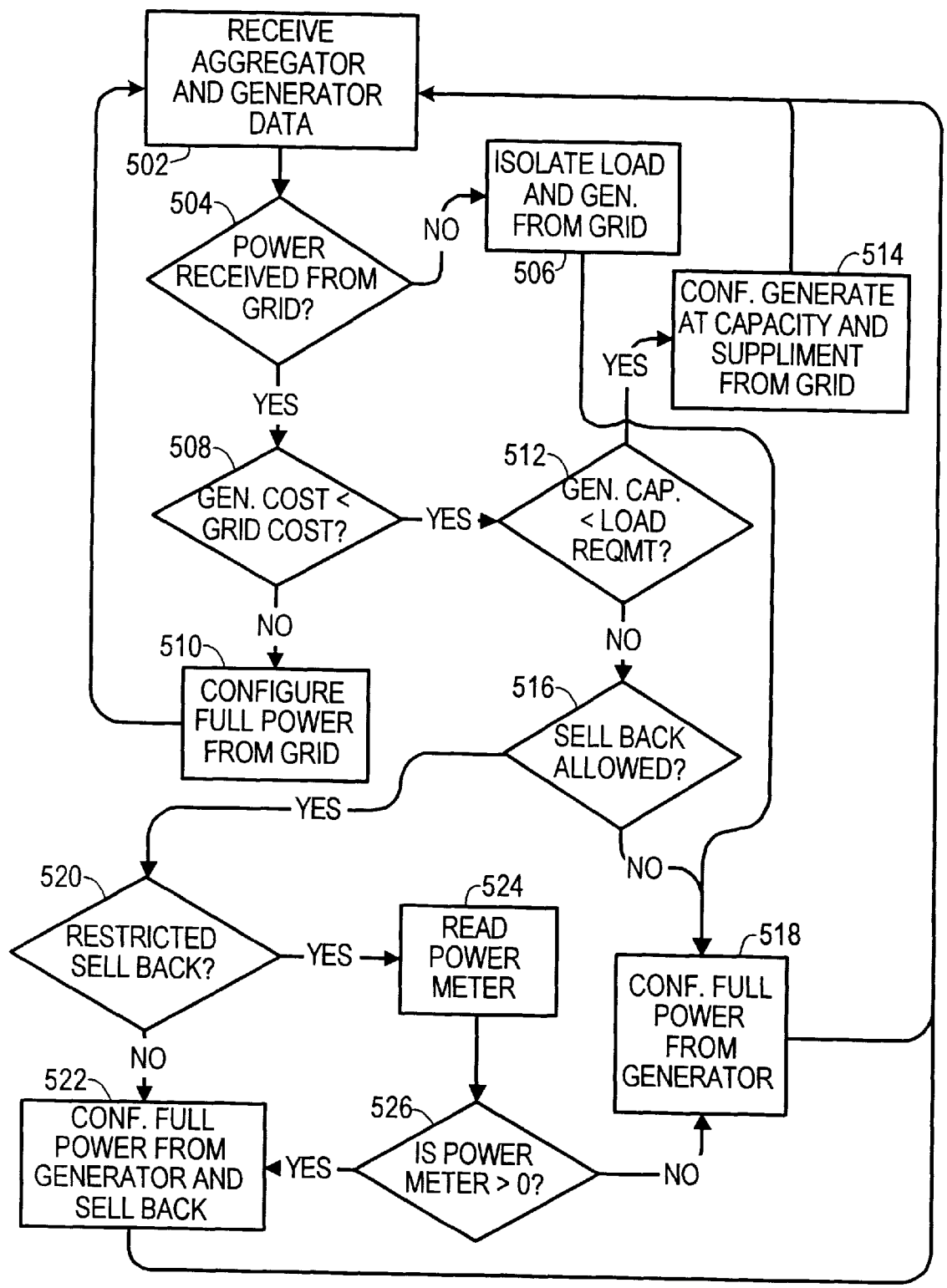
FIG. 5 is a flow chart of a method according to the invention.

As shown in FIG. 5, in one embodiment, the controller receives data 502 from the aggregator, the generator and, possibly, other outside sources. The data from the generator could include data about the efficiency of the generator. The controller determines 504 if there is power on the power grid. If not the controller isolates the load from the power grid 506 and then configures the system to fully power the load from the generator 518. Fully powering the load from the generator could be done by using a "load following" mode, in which the generator ramps its production of electricity up or down depending on the demand conditions of the local load when isolated from the grid. For example, if a homeowner shuts off an air conditioner, the generator ramps down to decrease power output to match the new local demand.

If power is available from the power grid, then the controller determines 508 if the cost of locally generated power is less than the cost of power from the grid If not then the controller configures 510 the system so that all power is being received from the grid If it is economically desirable to generate power locally, the controller determines 512 if the capacity of the generator is less than the power requirement of the load If it is, then the controller configures 514 the system so that the generator supplies its full capacity to the load and so that the load is supplemented with power from the power grid If the generator capacity is not less than the load requirement, then the controller determines 516 if sell back of power is allowed. This determination would be based on local utility regulations. If the selling back of power is not allowed, then the system is configured 518 into the load following mode. If sell back is allowed, then the controller determines 520 if sell back is restricted to putting power onto the grid only if the power meter shows a positive balance on the user's account. This mode is useful in regions that do not require the utility to buy back power from the user, other than to apply a credit to the user's account not to exceed the positive balance in the user's account If there are no reasons to restrict sell back of power, such as in a fully competitive market, then the controller will configure 522 the system so that the load is fully powered by the generator and any excess generator power is transmitted to the power grid. If the user is in a region in which sell back is restricted to current positive balance of the power meter, then the controller reads account information stored in the power meter 524 and determines 526 if the user has a positive balance. If the result is that there is a positive balance, then the controller will configure 522 the system so that the load is fully powered by the generator and any excess generator power is transmitted to the power grid. Other wise, if the power meter indicates that the user does not have a positive account balance, then the controller configures 518 the system so that full power to the load is supplied by the generator.

Several factors might influence the sell back decision, which would be based on information received from the meter (such as current account balance) and data from the aggregator (such as fuel and electricity prices). It is entire possible that the system generates power to avoid utility pricing, but do not sell back even when the meter is positive. For example, if the economics of selling power to the utility are unfavorable at the power exchange, but if the cost of producing power locally was less that the cost of taking power from the grid, the system typically would maximally drive the load from the local generator. Factors that would influence such a decision include, but are not United to: transmission costs, distribution costs and market prices.

The controller could also be programmed to configure the system in a predetermined mode, such as load following mode, if communications with the aggregator are lost. This could be done, for example, by driving an interrupt pin on the controller when a communications failure occurs. The resulting interrupt routine could force the system into the predetermined configuration It is understood that the flowchart of FIG. 5 is just one illustrative way of the many ways that a controller may be programmed within the scope of the invention. The actual program employed would depend on the specifics of the application for which the invention is used.

The above described embodiments are given as illustrative examples only. It will be readily applied that many deviations may be made from the specific embodiments disclosed in this specification without departing from the invention Accordingly, the scope of the invention is to be determined by the claims below rather than being limited to the specifically described embodiments above.

What is claimed is:

1. An apparatus for electrical source sharing between a power grid, at least one local generator and a local load, comprising:
    a. a power circuit capable of effecting a plurality of source sharing configurations, including:
        i. a first configuration in which the local load is fully powered by the power grid;
        ii. a second configuration in which the local load is fully powered by the local generator; and
        iii. a third configuration in which the local load is partially powered by the power grid and partially powered by the local generator;
    b. a data port capable of receiving data from an external source; and
    c. a controller that is programmed to execute the following operations:
        i. receive data from the data port;
        ii. determine a preferred source sharing configuration from the plurality of source sharing configurations, based on data received from the data port; and
        iii. instruct the power circuit to effect the preferred source sharing configuration.

2. The apparatus of claim 1, wherein the power circuit is capable of effecting a fourth configuration in which the local load is fully powered by the local generator and in which the power grid receives power from the local generator.

3. The apparatus of claim 2, wherein the controller is further programmed to execute a net metering mode, wherein the controller monitors a current local utility bill value and excludes the fourth configuration when the current local utility bill value is not greater than a predetermined threshold value.

4. The apparatus of claim 3, wherein the predetermined threshold value is zero.

5. The apparatus of claim 1, wherein the controller is further programmed to isolate the local generator from the power grid upon sensing a power grid power failure.

6. The apparatus of claim 1, wherein the external source is an aggregator that provides real-time information to the controller relating to at least one economic aspect of at least one parameter affecting which source sharing configuration should be the preferred source sharing configuration.

7. The apparatus of claim 6, wherein the real-time information includes data relative to a current cost of power from the power grid.

8. The apparatus of claim 6, wherein the real-time information includes data relative to a current cost of operating the local generator.

9. The apparatus of claim 6, wherein the controller is programmed to provide operating information to the aggregator.

10. The apparatus of claim 1, wherein the external source is a local electric meter.

11. The apparatus of claim 1, wherein the external source is a local gas meter.

12. The apparatus of claim 1, wherein the controller is operationally coupled to the local generator and is programmed to selectively activate and deactivate the local generator.

13. The apparatus of claim 1, wherein the controller comprises a programmable digital controller.

14. The apparatus of claim 1, wherein the power circuit comprises:

a. a saturable core reactor that is responsive to a control signal from the controller and that receives a utility alternating current from the power grid, wherein the saturable core reactor produces a controlled alternating current having a power value that is a function of the control signal;

b. an inverter that receives a generator direct current from the local generator and that produces a corresponding inverted alternating current that is synchronized to the utility alternating current from the power grid; and c. a summation circuit that receives the inverted alternating current and the controlled alternating current and that produces a load alternating current corresponding to a summation of the inverted alternating current and the controlled alternating current.

15. The apparatus of claim 1, wherein the power circuit comprises:

a. a rectifier that receives a utility alternating current from the power grid and that produces a rectified direct current corresponding to the alternating current;

b. a pulse-width modulation converter that receives the rectified direct current and that is responsive to a control signal from the controller, wherein the pulse-width modulation converter produces a converted direct current having a power value that is a function of the control signal;

c. a summation circuit that receives a generator direct current from the local generator and the converted direct current, and that produces a summed direct current having a power value corresponding to a summation of the generator direct current and the converted direct current; and d. an inverter that receives the summed direct current and that produces a load alternating current corresponding to the summed direct current.

16. The apparatus of claim 1, wherein the controller is further programmed to instruct the power circuit to effect a predetermined source sharing configuration upon sensing loss of communication with the external source.

17. The apparatus of claim 1, wherein the power circuit includes a switching element that isolates the generator from the power grid when the power grid is incapable of supplying power to the local load.

18. The apparatus of claim 1, wherein the controller is further programmed to operate in a load following mode in which the controller senses a requirement of the load and activates the local generator to meet the requirement.

19. An apparatus for electrical source sharing between a power grid, at least one local generator and a local load, comprising:

a. a power circuit capable of effecting a plurality of source sharing configuration including:

i. a first configuration in which the local load is fully powered by the power grid;

ii. a second configuration in which the local load is filly powered by the local generator;

iii. a third configuration in which the local load is partially powered by the power grid and partially powered by the local generator; and iv. a fourth configuration in which the local load is fully powered by the local generator and in which the power grid receives power from the local generator;

b. a data port capable of receiving data from an electric meter, a gas meter, a local generator and an aggregator that provides real-time information to the controller relating to at least one economic aspect of at least one parameter affecting which source sharing configuration should be the preferred source sharing configuration; and c. a programmable digital controller that is operationally coupled to the generator and that is programmed to execute the following operations:

i. receive data from the data port;

ii. determine a preferred source sharing configuration from the plurality of source sharing configurations, based on data received from the data port;

iii. instruct the power circuit to effect the preferred source sharing configuration;

iv. if a predetermined condition is met, execute a net metering mode, wherein the controller monitors a current local utility bill value and excludes the fourth configuration when the current local utility bill value is not greater than zero;

v. upon sensing a power grid power failure, isolate the local generator from the power grid; and vi. selectively activate and deactivate the local generator.

* * * * *